B. C. RUSSELL.
GRASS SCORCHER.
APPLICATION FILED JUNE 7, 1916.
1,223,115.
Patented Apr. 17, 1917.
2 SHEETS—SHEET 2.
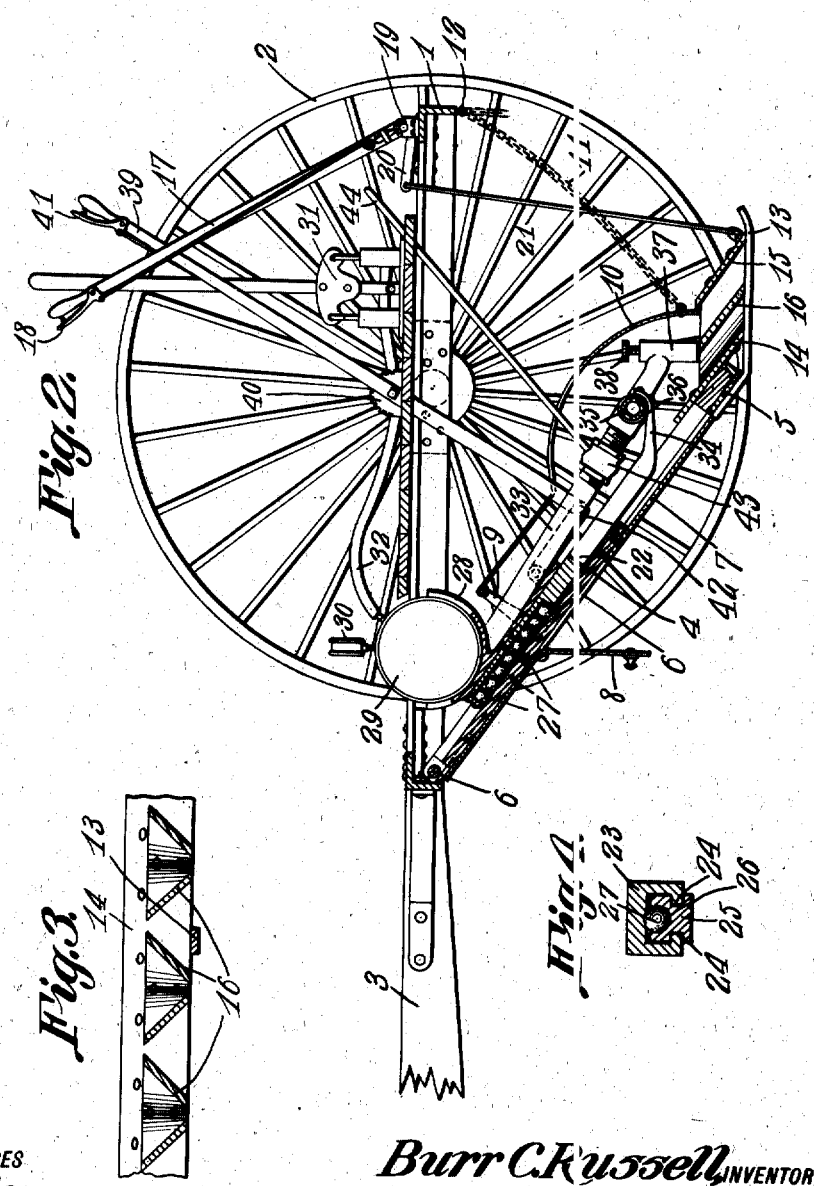
Burr C. Russell, INVENTOR
WITNESSES
ATTORNEYS

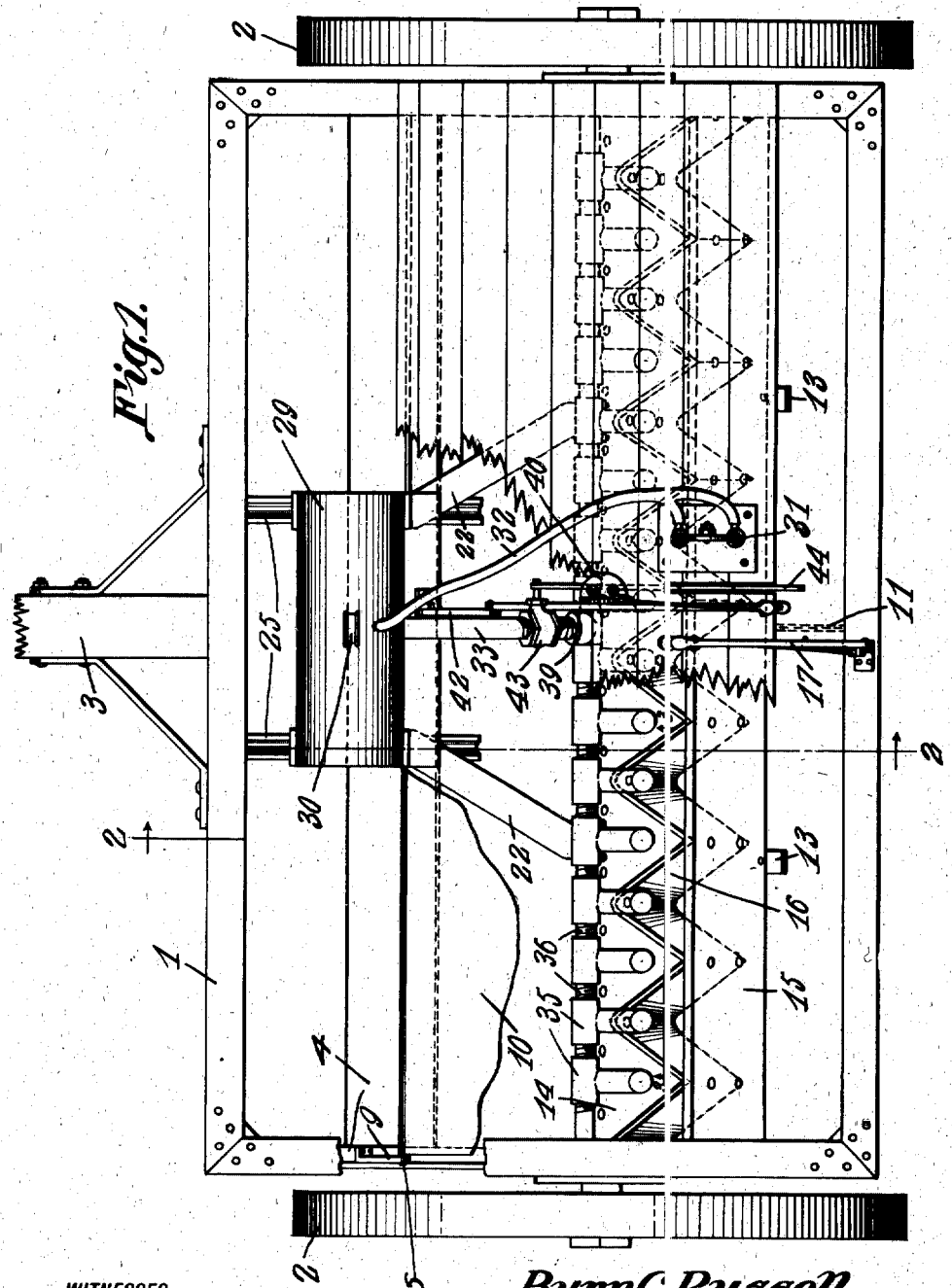

UNITED STATES PATENT OFFICE.

BURR C. RUSSELL, OF WINFIELD, KANSAS.

GRASS-SCORCHER.

1,223,115.  Specification of Letters Patent.  Patented Apr. 17, 1917.

Application filed June 7, 1916. Serial No. 102,197.

*To all whom it may concern:*

Be it known that I, BURR C. RUSSELL, a citizen of the United States, and a resident of Winfield, in the county of Cowley and State of Kansas, have invented new and useful Improvements in Grass-Scorchers, of which the following is a specification.

My invention is an improvement in grass scorchers and has for its object to provide a machine of the character specified, for scorching and killing grass and the like, in newly mown alfalfa fields, from which the crop has been removed, without injuring the alfalfa. A further object is to provide mechanism capable of ready adjustment for controlling the flames from a series of burners within a narrow prescribed area whereby to prevent the prolonged exposure of the grass to the flames with a resultant firing of the same and consequent injury to the alfalfa crop.

In the drawings:

Figure 1 is a top plan view of the improved machine with parts broken away,

Figs. 2 and 3 are sections on the line 2—2 and 3—3 respectively, each view looking in the direction of the arrows adjacent to the line, and Fig. 4 is a transverse vertical section through one of the guideways.

The present embodiment of the invention is shown in connection with a wheel supported main frame 1 of substantially rectangular form, having wheels 2 at the sides thereof, and having a tongue 3 at the center of the front for drawing the machine through the field.

An auxiliary frame consisting of side bars and a connecting rear end bar 5 is supported by the main frame, the end bars 4 being hinged to the main frame at their front and upper ends as indicated at 6. A plate 7 of sheet iron or the like, covers the front or under side of the auxiliary frame, and a draft opening is provided in this plate, the opening being provided with a door or damper 8 hinged to the auxiliary frame for regulating the size of the opening. Standards 9 are connected with the side bars 4 near their upper ends, and a cover plate 10 is hinged to the standard, the cover plate closing the rear or upper face of the auxiliary frame, and providing with the front plate 7, a closed chamber in which the burners are arranged.

A flexible member 11, as for instance a chain, is connected with the rear of the plate 10, and this chain is adapted to engage a hook 12 on the main frame, for holding the plate in adjusted position. It will be noticed from an inspection of Fig. 2 that the rear of said plate is arched transversely, and the burners to be later described, are mounted in the compartment formed in the auxiliary frame. A series of shoes or runners 13 is connected with the rear lower end of the auxiliary frame the said runners being spaced apart and extending rearwardly, and being adapted to run upon the ground, and a front plate 14 is arranged transversely of the auxiliary frame at the said rear end, the lower edge of the plate resting on the runners. A rear plate 15 is supported parallel with the plate 14 near the rear of the runners, and inclined plates 16 connect the plates 14 and 15.

These plates 16 are arranged as shown in Figs. 1 and 3, the said plates being arranged at approximately right angles with respect to each other and having their planes inclined also. Thus a series of burning or scorching compartments is provided extending transversely of the main frame and the auxiliary frame, the alternate compartments having their apices forward, while the intermediate compartments have their apices rearward. These compartments are open at their tops and at their bottoms, and in addition to serving as division members for the compartments, the plates 14, 15 and 16 are agitators for agitating the grass.

Means is also provided for adjusting the rear of the auxiliary frame, said means comprising a lever 17 pivoted to the main frame, and having latch mechanism coöperating with a toothed quadrant 19 on the frame, and the lever has an angular arm 20 which is connected by a link 21 with the rear plate 15 of the auxiliary frame. By means of the lever the rear end of the auxiliary frame may be raised or lowered with respect to the main frame.

A carriage 22 is mounted to travel on the auxiliary frame toward and from the burner compartments, the said carriage having channeled guide members 23 which have internal ribs 24 on their side walls engaging in grooves in the sides of the guide bars 25, secured to the auxiliary frame. The upper faces of the guide bars 25 are channeled as shown at 26, and a series of balls 27 is arranged in each channel, the guide members 23 riding on the balls. A cradle 28 is supported at the upper end of the carriage, and a tank or reservoir 29 is supported by the cradle, the tank being adapted to contain a liquid fuel, as for instance, gasolene or kerosene.

A gage 30 is provided in connection with the tank, and a pump indicated at 31 is mounted on the main frame for supplying air to the tank, and the pump is connected to the tank by a flexible hose 32. A discharge pipe 33 leads rearwardly from the under side of the tank, and connects at its lower end with a cross pipe which supports the burners. This cross pipe is supported by angular lugs 34 extending upwardly and rearwardly from the carriage, and the said pipe is composed of a series of T's 35 arranged in alinement and connected by threaded nipples 36. A burner 37 is connected with the lateral branch of each T, and the discharge end of each burner is directly above one of the compartments formed between the plates 14, 15 and 16 delivering through the said compartment.

Each burner is provided with controlling means indicated at 38, and the carriage is moved on the auxiliary frame by means of a lever 39, which is pivoted to a toothed quadrant 40 on the main frame, and the lever has latch mechanism 41 coöperating with the quadrant to hold the lever in position. At its lower end a link 42 connects the lever with the carriage, and it will be evident that by means of the lever, the carriage may be adjusted on the auxiliary frame. A cut off valve 43 is interposed in the length of the feed pipe for the burners, and an operating rod 44 is connected with the rod for operating the same, the rod extending into position to be grasped by the operator on the main frame. The damper 8 is hinged at its front or upper edge to the auxiliary frame, so that when open it depends in front of the opening 6 to prevent the direct passage of air to the burner. The plates 7 and 10 are wind shields, and by means of the lever 39 the burners may be brought nearer to or farther away from the grass to be burned, to regulate the degree of burning of the same.

In operation, when it is desired to burn the grass, the parts are arranged as shown in Fig. 2, the wind-shield 10 being adjusted to provide the proper amount of air in conjunction with the damper 8. When the portion 14—15—16 of the auxiliary frame passes over the grass, the plates 16, as well as the plates 14 and 15, will separate the short grass exposing it to the quickly passing flame at different angles, and in addition exposing the young grass between and below the high growth which otherwise would immediately take the place of the scorched grass. In practice, without some device of this character, the tenacious densely growing grasses such as foxtail, crab grass, and false red-top, can hardly be thoroughly exposed in the necessarily brief time they are under the flames.

As is known, the grass seeds germinate in the spring when the alfalfa has started and before it is large enough to cover the ground. In a month to six weeks, the alfalfa is perhaps two feet in height and will yield a crop of clean hay having the heaviest foliage of the year. When this shade is removed, the grass already started has been growing so brief a length of time, that it has not greatly suffered, and as a rule it will be just high enough to escape the mower. The sickle of the mower soon becomes dull in cutting the woody stems of the alfalfa and will brush over grass five inches in height with very little cutting. It is now that the grass will spring up faster than the alfalfa unless its growth is checked. This grass having grown until now under disadvantageous circumstances, will be leafless, straight, slender and dense, but not matted as would be the case had it grown in the open where the blades would have grown broad and rank and leaves would have put forth.

It is obvious that the high grass under these conditions, will serve to shield the shorter grass beneath from the quickly passing flame. Hence will be seen the necessity for a separating agitating means to permit the flames to reach the under growth and to thoroughly expose the stems as they spring up under the brushing of the agitator. Furthermore, the arrangement of the burners in separate compartments localizes the flame from each burner on the direct part to be treated, and prevents injury to the alfalfa crowns through which the agitator is passing. Furthermore, the arrangement of the auxiliary frame supported on the runners, lifts the burners in passing over obstructions, as for instance stones, tree roots and the like.

It will be noticed from an inspection of the drawings, that the flame from each burner strikes on the inclined front plate of the agitator and on the forward apices of the alternate triangular compartments, and the point of contact is convexed slightly to distribute the flame in a sheet.

What I claim is:

1. A device of the character specified comprising a wheel supported main frame, an auxiliary frame hinged at the front of the main frame beneath the same and having shoes or runners at its rear end adapted to run upon the ground, a pair of plates at the rear of the auxiliary frame and connected therewith, said plates being parallel with the plane of the frame and with each other, and spaced apart and connected by inclined connecting plates dividing the space between the first named plates into a series of substantially triangular compartments open at their top and bottom, the alternate compartments having their apices forward and the intermediate compartments having their apices rearward, a carriage mounted to move on the auxiliary frame toward and from the compartments, and supporting a burner for each compartment, said burners being in alinement transversely of the frames, a source of supply for fuel under pressure on the carriage and delivering to the burners, windshields at the front and rear of the auxiliary frame and forming a closed compartment in which the burners are arranged, the rear shield being adjustable and the front shield having a draft opening and a damper for closing the opening, means for raising and lowering the rear end of the auxiliary frame, and means for moving the carriage.

2. A device of the character specified comprising a wheel supported main frame, an auxiliary frame hinged at the front of the main frame beneath the same and having shoes or runners at its rear end adapted to run upon the ground, a pair of plates at the rear of the auxiliary frame and connected therewith, said plates being parallel with the plane of the frame and with each other, and spaced apart and connected by inclined connecting plates dividing the space between the first named plates into a series of substantially triangular compartments open at their top and bottom, the alternate compartments having their apices forward and the intermediate compartments having their apices rearward, a carriage mounted to move on the auxiliary frame toward and from the compartments, and supporting a burner for each compartment, said burners being in alinement transversely of the frames, and a source of supply for fuel under pressure on the carriage and delivering to the burners.

3. A device of the character specified comprising a wheel supported main frame, an auxiliary frame hinged at the front of the main frame beneath the same and having shoes or runners at its rear end adapted to run upon the ground, a pair of plates at the rear of the auxiliary frame and connected therewith, said plates being parallel with the plane of the frame and with each other, and spaced apart and connected by inclined connecting plates dividing the space between the first named plates into a series of substantially triangular compartments open at their top and bottom, the alternate compartments having their apices forward and the intermediate compartments having their apices rearward.

4. A device of the character specified comprising a wheel supported main frame, an auxiliary frame hinged at the front of the main frame beneath the same and having shoes or runners at its rear end adapted to run upon the ground, a pair of plates at the rear of the auxiliary frame and connected therewith, said plates being parallel with the plane of the frame and with each other, and spaced apart and connected by inclined connecting plates dividing the space between the first named plates into a series of substantially triangular compartments open at their top and bottom, the alternate compartments having their apices forward and the intermediate compartments having their apices rearward, and a burner for each compartment supported by the auxiliary frame.

5. A device of the character specified comprising a wheel supported frame, an auxiliary frame hinged thereto at the front of the main frame and having a series of burning compartments at the rear end thereof and adapted to run upon the ground and open at the top and bottom, a burner supported by the auxiliary frame at each compartment and delivering through the compartment, the compartments being substantially triangular in shape, and the alternate compartments having their apices in the opposite direction to the intermediate compartments and the lower edges of the compartments engaging the grass to separate and support the same 6. A device of the character specified comprising a wheel supported frame, an auxiliary frame hinged thereto at the front of the main frame and having a series of burning compartments at the rear end thereof and adapted to engage and run upon the ground to separate and support the grass and open at the top and bottom, and a burner supported by the auxiliary frame at each compartment and delivering through the compartment.

7. A device of the character specified comprising a series of burners, means for supporting and moving the burners, means for directing the flames from the burners and for spreading and separating the grass to facilitate access of the flames thereto, and comprising a pair of plates one arranged in front and one in rear of the burners, and partitions arranged in inclined position between the first named plates and at approximately right angles to each other, said portions being inclined with respect to the front and the rear plates.

BURR C. RUSSELL.

Witnesses:
EARLE D. YOULI,
GEO. E. TOOMEE.